United States Patent [19]

Galbreath et al.

[11] 3,984,360
[45] Oct. 5, 1976

[54] LEAD-FREE SPRAYABLE POLYURETHANE SYSTEM AND RIGID CELLULAR PRODUCTS

[75] Inventors: Dennis E. Galbreath, Newark; William R. Proops, Hockessin, both of Del.

[73] Assignee: Witco Chemical Corporation, New York, N.Y.

[22] Filed: Nov. 12, 1974

[21] Appl. No.: 523,111

[52] U.S. Cl. ................. 260/2.5 AQ; 260/2.5 AC; 428/425
[51] Int. Cl.$^2$ ............................ C08G 18/14
[58] Field of Search ............ 260/2.5 AQ, 2.5 AC

[56] References Cited
UNITED STATES PATENTS

| | | | |
|---|---|---|---|
| 3,091,551 | 5/1963 | Robertson | 260/2.5 AQ |
| 3,179,606 | 4/1965 | Prescott et al. | 260/2.5 AQ |
| 3,192,185 | 6/1965 | Achterhof et al. | 260/75 NE |
| 3,267,050 | 8/1966 | Kuryla et al. | 260/25 AQ |
| 3,314,995 | 4/1967 | Cross et al. | 260/2.5 AQ |
| 3,336,245 | 8/1967 | Britain | 260/2.5 AQ |
| 3,476,933 | 11/1969 | Mendelsohn | 260/2.5 |
| 3,847,992 | 11/1974 | Moss | 260/2.5 AQ |

Primary Examiner—H.S. Cockeram
Attorney, Agent, or Firm—Albert L. Gazzola; Jordan J. Driks; Morton Friedman

[57] ABSTRACT

A lead-free rigid polyurethane foam which cures rapidly at low temperatures and which comprises an organic isocyanate, a polyol, a catalyst, a foaming agent, a cell-size regulator and a primary polyoxyalkylene amine.

9 Claims, No Drawings

LEAD-FREE SPRAYABLE POLYURETHANE SYSTEM AND RIGID CELLULAR PRODUCTS

BACKGROUND

It has long been recognized that lead salts, when used as catalysts in the preparation of rigid polyurethane foam compositions, provide fast cream times and rapid cure at low temperatures. It has likewise been known for sometime that the toxicity associated with these lead compounds is very undesirable.

Heretofore, however, substitution of the lead salt catalyst with a nontoxic component or components has resulted in compositions which are lacking in one or more of the desirable characteristics associated with the lead salt-catalyzed compositions. Another drawback has been that non-toxic components have been incompatible with the remaining composition components for one reason or another.

In a search of the U.S. patent art, we have uncovered the following U.S. Pat. Nos. 3,136,731, Helmut Piechota et al., issued June 9, 1964; 3,148,162, Gmitter et al., issued Sept. 8, 1964; 3,179,606, Prescott et al., issued Apr. 20, 1965; 3,255,129, Ferrari, issued June 7, 1966; 3,261,813, Ramos, issued July 19, 1966; 3,547,841, Overmars et al., issued Dec. 15, 1970; 3,686,101, Davis et al., issued Aug. 22, 1972; 3,806,475, Narayan et al., issued Apr. 23, 1974; 3,821,131, Priest et al., issued June 28, 1974; and 3,838,076, Moss et al., issued Sept. 24, 1974.

Also relevant and of interest is a bulletin by Jefferson Chemical Co., Inc., Houston, Texas, entitled "Advance Technical Data" relating to their Jeffamine polyoxypropyleneamines, Copyright 1969. This bulletin discloses polyoxypropyleneamines of the type contemplated herein and their use as epoxy resin curing agents. The bulletin further states that "Similar compounds have found utility in foam (Ref. 11)..." Reference 11 is the aforementioned U.S. Pat. No. 3,179,606, Prescott et al., which teaches the use in cellular polyurethane plastic materials of polyamine compounds of the formula:

"$H_2N(-CH_2-CH_2-NH-)_x-(R-O)-$
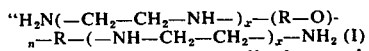$_n-R-(-NH-CH_2-CH_2-)_x-NH_2$ (I)

wherein R is an alkylene radical containing from 2 to 4 carbon atoms, x is an integer from 0 to 4 and n is an integer such that the polyglycol starting material used to prepare the polyamide compound has an average molecular weight of from about 400 to about 2000."

As will be evident from the invention herein described, Prescott et al. differs materially therefrom and is thus readily distinguishable.

INVENTION

Broadly, the present invention is directed to lead-free cellular polyurethane products prepared from compositions which cure rapidly at low temperatures. More particularly, the instant discovery concerns compositions suitable for spraying at relatively low temperatures to form rigid cellular polyurethane, the compositions characterized in that they are leadfree, they cream rapidly and they cure rapidly to very desirable cellular polyurethane products. By "rapid cream time" is meant herein that polymerization, even at low temperatures, is initiated very rapidly. This feature, coupled with rapid cure times, yields a urethane foam spray system which is extremely versatile, as will be seen hereinafter.

Of course, one of the major advantages of the present invention is the fact that toxic lead components are substituted with the non-toxic organic catalysts herein taught which exhibit similar effective catalytic properties, including, of course, rapid creaming and curing.

According to the present invention, a lead-free composition is prepared which comprises (a) a polyol, (b) an organic isocyanate, (c) a polyoxyalkylene primary amine, (d) a foaming agent, (e) an amine/tin catalyst and (f) a cell-size regulator.

By "polyols" is intended herein hydroxy-terminated alkyl ($C_2$-$C_8$), aryl (e.g., phenyl), alk(lower)aryl and aralkyl ($C_2$-$C_8$) compounds and hydroxy-terminated tertiary amine compounds of, preferably, said alkyl, aryl, alkaryl and aralkyl moieties, there being 3 to 8 hydroxy groups per polyol compound and said moieties containing, in turn, from 0 to 3 alkoxy units per moiety, the alkoxy moiety having from 2 to 4 carbon atoms.

Typical of such polyols are sorbitol, triethanolamine, pentaerythritol, sucrose, glycerine, 1,3,6-hexane triol, 1,3,7-heptane triol, 1,4,8-octane triol, 1,2,5,6-hexane tetrol, 1,2,3,4,6,7,8-octane heptol, trihexanolamine, trimethylol propane, alpha-methyl glucoside, phenolformaldehyde condensation products, phenol aniline formaldehyde condensation products, Mannich condensation products of phenol-formaldehyde and alkanolamines, such as diethanolamine, and other like hydroxyterminated polyols within the purview of the present invention.

As will be seen hereinafter, the concentration of these polyols in the compositions of the instant discovery is based upon 100% total weight of the composition, even though the components are generally separated into a two-part system. Also, as will likewise be seen hereinafter, the concentration of the polyol in the composition is coordinated with the organic isocyanate (polyisocyanate) component based upon a so-called isocyanate index.

Of course, the just-mentioned illustrative polyols are by no means meant to be limiting, since it is obvious from the hydroxy-terminated compounds generically defined hereinbefore that any number of similar such compounds are contemplated herein. These polyols, as likewise hereinbefore established, are of controlled hydroxy content and, when present, alkoxy additions, in order to achieve the very desirable products of the present invention.

Likewise, to insure production of rigid foams pursuant to the present invention, the organic isocyanate reactants herein contemplated are those having at least one aromatic moiety (e.g., phenyl)per isocyanate (-NCO) substitutent. Illustrative of these are: methylene diphenyl diisocyanate; crude methylene diphenyl diisocyanate; 4,4'-diphenyl diisocyanate; 4,4'-diphenyl ether diisocyanate; 4,4',4''-triphenyl triisocyanate; 3,3'-dimethoxy-4,4'-diphenyl diisocyanate; 4,4',4''-triphenylmethane triisocyanate, naphthylene-1,5-diisocyanate; 4,4'-biphenylene diisocyanate; 3,3'-dimethoxy-4,4'-biphenyl diisocyanate; 3,3'-dimethyl-4,4'-biphenyl diisocyanate; 3,3'-dimethyldiphenylmethane-4,4'-diisocyanate; and other like organic isocyanates and polyisocyanates prepared in conventional ways, such as by phosgenation of the corresponding amine.

As will be seen in more detail hereinafter, the polyol and organic isocyanate constitute the major components of the compositions of the present invention. Sufficient of the polyol and organic isocyanate is added to make up 100% by weight, once the minor component concentrations, as indicated infra, are totalled. Further, sufficient of each of these two principal components is present to provide an isocyanate index in the range of 90 to 150, preferably 100 to 120. The index is the ratio of isocyanate equivalents to active hydrogen equivalents.

The polyoxyalkylene primary amines of the instant discovery have the formula $$R[(O-R')_xNH_2]_y$$

wherein x is an integer from 1 to 8, y is an integer from 1 to 4, R is selected from branched or straight chain alkyl having from 2 to 8 carbon atoms ($C_2$-$C_8$) and branched or straight chain monoalkyl amine having from 2 to 8 carbon atoms ($C_2$-$C_8$), R' is branched or straight chain alkylene having from 2 to 4 carbon atoms, R being monoalkyl amine only when y is 1.

Typical very desirable polyoxy alkylene primary amines are the polyoxyisopropylene amines, such as

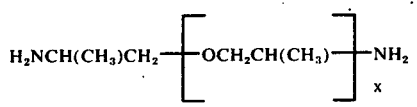

(i)

wherein x is from 2 to 6, and

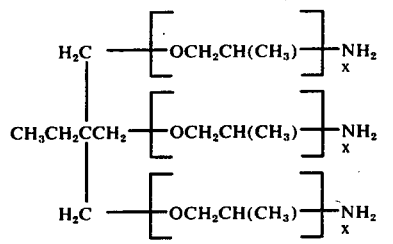

(ii)

wherein the total combined x value is from 3 to 6.

Of course, R may be ethyl, propyl, butyl, isobutyl, pentyl, isopentyl, 2-ethylpropyl, heptyl, isooctyl, and the like, or the corresponding monoalkyl amine.

The polyoxyalkyleneamines herein contemplated are present in the concentration of about 0.25 to about 10%, by weight, preferably about 0.5 to about 5%, based upon the total weight (100%) of the composition. Even though the compositions are generally and preferably prepared from a two-part system (i.e., what may be considered the isocyanate formulation, or "A" component, and the resin formulation, or "B" component), the percentages reported herein are computed from the combined weight of "A" and "B," vis., 100%.

The expression "foaming agent," as used herein, refers to the critical $H_2O$/blowing agent component. Water, according to the present invention, is present in the concentration of about 0.05 to about 2.5%, preferably about 0.1 to about 1.0%.

The blowing agents within the purview of the instant invention are the well-known lower-boiling halogenated lower alkanes used as propellants and refrigerants, e.g., chlorofluoromethanes, chlorofluoroethanes. Typical are trichloromonofluoromethane, dichlorodifluoromethane, dichloromonofluoromethane, 1,1-dichloro-1-fluoroethane, 1,1-difluoro-1,2,2-trichloroethane, chloropentafluoroethane, and the like.

The blowing agents are generally present in the concentration of about 3.5 to about 25%, preferably about 10 to about 20%. The higher concentrations are thus preferred to achieve the desirable rigid foams of the present invention.

The amine/tin catalysts of the present invention are, more specifically, the tertiary amine catalysts and the organic and inorganic tin catalysts. Illustrative tertiary amine catalysts are hexahydrodimethyl aniline, triethyl amine, N-ethylmorpholine, N-methyl-N-dimethylaminoethyl piperazine, triethylene diamine, permethylated diethylene triamine, bisaminoethanol adipate, N-methyl morpholine, dimethyl laurylamine, N-laurylmorpholine amine, dimethyl cetyl amine, N,N,N',N'-tetramethyl-1,3-butylene diamine, diethyl ethanol amine, N-coco-morpholine, 3-ethyl-N-dimethyl propyl amine, N-dimethyl-N-methyl-isopropyl propylene diamine, N-dimethyl amino propyl acetamide, N,N-dimethyl N-isopropyl amine, dimethyl ethanolamine, dimethyl benzyl amine, hydromethyl morpholine, dimethyl propyl amine, N,N-diethyl ethanol amine benzoate, diethylene amino ethanol benzene, and the like. Of course, other tertiary amines also of this type are likewise contemplated.

Generally, the tertiary amine catalysts are present in the composition, depending upon the activity of the catalyst, in the concentration range of about 0.05 to about 3.0%, preferably about 0.2 to about 2.0%. The tin catalyst concentration is generally from about 0.05 to about 3.0%, preferably from about 0.1 to about 1.0%.

Representative tin catalysts, on the other hand, are butyltin trichloride, stannic chloride, tributyltin cyanate, stannous octoate, stannous oleate, dibutyltin di(2-ethyl hexoate), dibenzyltin di(2-ethyl hexoate), dibutyltin dilaurate, dibutyltin diisoctylmaleate, dibutyltin sulfide, dibutyltin dibutoxide, dibutyltin bis-(o-phenylphenate), dibutyltin-bis(acetylacetonate), di(2-ethylhexyl) tin oxide, dibutyltin bis(2-ethylhexyl mercaptide), and other like mercaptides and tin catalysts.

The surface active agents (surfactants) or cell-size regulators of the present invention are, preferably, the silicone oils. Typical are the polysiloxane polyoxyalkylene blocked copolymers, generally referred to as L-520, L-521, L-5340, L-5420, SF-1109, DC-193, and the like. These are generally present in he concentration of about 0.025 to about 5.0%.

Optionally, a fire retardant in minor conventional quantities may be included, such as tris(chloroethyl) phosphate, tris(2,3-dibromopropyl) phosphate, diammonium phosphate, phosphorus-containing polyols, antimony oxide, triethyl phosphate, tris(chloropropyl) phosphate, and the like.

EXAMPLES

The present invention will be more fully described by reference to the following examples which illustrate certain preferred embodiments of the present invention.

EXAMPLE I

Resin component:

| | |
|---|---|
| 70.87 | aromatic tertiary amine triol having equivalent weight of 106, R 350X[1] |
| 0.49 | water |
| 0.49 | silicone surfactant, L-5420[2] |
| 25.24 | trichlorofluoromethane |
| 0.97 | 70% bis(2-dimethylaminoethyl)ether, 30% dipropylene |

-continued

```
         glycol, NIAX A-1(3)
  0.97   dialkyl tin dicarboxylate containing 18% tin, Markure
         UL-2(4)
  0.97   tetraethylene pentamine Isocyanate component:
  94.0   crude methylene diphenyl diisocyanate
   6.0   tris-2,3-dibromopropyl phosphate, fire retardant Hand Mix Times: at 5°C
Mix time         7''
Cream time       8''
Rise time       40''
Tack free time  40''
Density          2.0

Resin component is cloudy due to insolubility of
  tetraethylene pentamine.

(1)Jefferson Chemical Co., Inc., Austin, Texas
(2)Union Carbide Corporation, New York, New York
(3)Union Carbide Corporation, New York, New York
(4)Witco Chemical Corporation, New York, New York
```

When sprayed on 20°F. steel reactivity is too slow.

EXAMPLE II

```
Resin component:
  70.5   aromatic tertiary amine triol having equivalent weight
         of 106, R 350X
   0.5   water
  25.1   trichloromonofluoromethane
   1.0   70% bis(2-dimethylaminoethyl)ether, 30% dipropylene
         glycol, NIAX A-1
   1.0   dialkyltin dicarboxylate containing 18% tin, Markure
         UL-2
   1.9   triethylene tetramine Isocyanate component:
  93.5   crude methylene diphenyl diisocyanate
   0.5   silicone surfactant, L-5340(5)
   6.0   tris-beta-chloroethyl phosphate, CEF(6)

Hand Mix Times: at 5°C
Mix time         7''
Cream time       7''
Rise time       10''
Tack free time  10''

Resin component is cloudy due to insolubility of
  triethylene tetramine.

(5)Union Carbide Corporation, New York, New York
(6)Stauffer Chemical Corporation, Westport, Connecticut
```

EXAMPLE III

```
Resin component:
  49.1   aromatic tertiary amine triol having equivalent weight
         of 106, R 350X
  18.3   aromatic tertiary amine pentol having equivalent weight
         of 125, R 650X(7)
   0.5   water
  23.8   trichloromonofluoromethane
   4.6   Jeffamine, D-400(8)
   2.8   dimethyl cyclohexylamine, Polycat 8(9)
   0.9   Markure UL-2

Isocyanate component:
  93.5   crude methylene diphenyl diisocyanate
   0.5   L-5340
   6.0   CEF Hand Mix Times: at 5°C
Mix time         7''
Cream time       7''
Rise time       27''
Tack free time  17''
Density          2.1

Resin component is clear showing no signs of
  incompatibility therein.
```

-continued

This system sprayed on 20°F. steel with good results.

```
(7)Jefferson Chemical Co., Inc., Austin, Texas
(8)Polyoxyisopropyleneamine having formula (ii), supra, wherein x is 2, by Jefferson
Chemical Co., Inc., Austin, Texas
(9)Abbott Laboratories, Chicago, Illinois
```

EXAMPLE IV

```
Resin component:
  49.1   R 350X
  18.3   R 650X
   0.5   water
  23.8   trichloromonofluoromethane
   4.6   Jeffamine D-230(10)
   2.8   Polycat 8
   0.9   Markure UL-22(11) dialkyl tin with S, 22% tin Isocyanate component:
  93.5   crude methylene diphenyl diisocyanate
   0.5   L-5340
   6.0   CEF Hand Mix Reactivity: at 5°C
Mix time         5''
Cream time       5''
Rise time       20''
Tack free time  12''

Resin component is clear showing no signs of
  incompatibility therein.
This system is sprayed on steel at 25°F. with
  excellent results.

(10)Polyoxypropyleneamine of formula (i), supra, wherein x is 3, by Jefferson
Chemical Co., Inc., Austin, Texas
(11)Witco Chemical Corporation, New York, New York
```

EXAMPLE V

Example III, supra, is repeated in every essential respect with the exception that trichloromonofluormethane/ dichlorodifluoromethane (15%/1%) is used as the blowing agent, and triethanolamine having one (1) propylene oxide moiety per hydroxy-terminated group is used as the polyol, the latter, one of the principal components in the composition, being present in a quantity sufficient to achieve, coupled with the remaining components (including the diminished percentage proportion of blowing agent), a 100% total weight of resulting composition, and providing an isocyanate index of 105.

EXAMPLE VI

Example IV is repeated in every essential respect with the exception that dibutyltin dilaurate 2% and dimethyl ethanolamine 0.75% are used instead of Markure UL-22 and Polycat 8, respectively, the polyol and polyisocyanate concentrations being modified according to Example V to achieve a total weight of 100% and an isocyanate index of 112.

EXAMPLE VII

Example IV is carried out in every essential respect with the exception that the polyol is trimethylol propane having one (1) ethylene oxide moiety per hydroxy-terminated group and the polyisocyanate is 4,4¹-diphenyl diisocyanate, sufficient of each being present to provide an isocyanate index of 115.

EXAMPLE VIII

Example IV is repeated in every essential respect with the exception that Jeffamine D-230 is present in the concentration of 1.9%, and the polyol is a phenol-formaldehyde condensation product having four hydroxy moieties to each of which has been added one ethylene oxide per hydroxy-terminated group, the polyisocyanate and polyol concentrations being modified as in Example V to provide the 100% total and an isocyanate index of 118.

Pursuant to statutory requirements, there are described above the invention and what are now considered its best embodiments. It should be understood, however, that the invention can be practiced otherwise than as specifically described, within the scope of the appended claims.

What is claimed is:

1. A rigid cellular polyurethane product prepared from a lead-free composition suitable for spraying to form said rigid cellular polyurethane in that it creams and cures rapidly at low temperatures, said composition comprising (a) a polyol selected from an aliphatic ($C_2$ - $C_8$) and an aromatic hydroxy-terminated compound, and an aliphatic ($C_2$ - $C_8$) and an aromatic hydroxy-terminated tertiary amine compound, there being 3 to 8 hydroxy groups per polyol, and said groups, in turn, being alkoxylated to the extent of containing from 0 to 3 alkoxy ($C_2$ - $C_4$) units per group, (b) an organic isocyanate having at least one aromatic moiety per isocyanate group, (c) about 0.25% to 10% of a polyoxyalkylene primary amine of the formula:

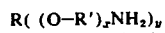

wherein x is an integer from 1 to 8, y is an integer from 1 to 4, R is selected from branched or straight chain alkyl having from 2 to 8 carbon atoms and branched or straight chain monoalkyl amine having from 2 to 8 carbon atoms, R' is branched or straight chain alkylene having from 2 to 4 carbon atoms, R being monoalkyl amine only when y is 1, (d) a foaming agent comprising 0.05% to about 3.0% by weight of $H_2O$ and, based upon the total weight of the said composition, from about 3.5 to about 25% of a halohydrocarbon blowing agent, (e) about 0.05% to 3.0% each of a tertiary amine and a tin cellular polyurethane catalyst and, (f) about 0.025% to about 5.0% of a surfactant cell-size regulator, the (a) and (b) components being the major components, in a ratio which provides an isocyanate index in the range of 90 to 150.

2. The product of claim 1 wherein the composition from which it is prepared contains a minor amount of a fire retardant.

3. The product of claim 1 wherein the ratio of (a) and (b) component provides an isocyanate index in the range of 100 to 120.

4. The product of claim 3 wherein the polyoxyalkylene primary amine component is present in the concentration of about 0.5 to about 5%, the water in the concentration of about 0.1 to about 1.0%, the tertiary amine catalyst in the concentration of about 0.2 to about 2.0%, the tin catalyst in the concentration of about 0.1 to about 1%, and the surfactant cell-size regulator in the concentration of about 0.025 to about 5%, the halohydrocarbon blowing agent in the concentration of about 10 to about 20%, and having an isocyanate index in the range of 100–120.

5. The product of claim 4 wherein the polyoxyalkylene primary amine is

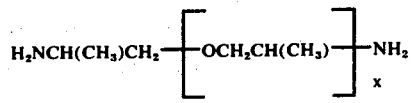

wherein x is 3.

6. The product of claim 4 wherein the polyoxyalkylene primary amine is

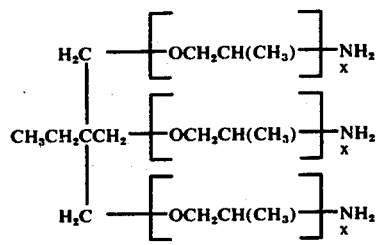

wherein x is 2.

7. The product of claim 4 wherein the blowing agent is trichloromonofluoromethane.

8. The product of claim 4 wherein the tertiary amine catalyst is dimethyl cyclohexylamine.

9. The product of claim 4 wherein the organic isocyanate is crude methylene diphenyl diisocyanate.

* * * * *